United States Patent Office 2,797,144
Patented June 25, 1957

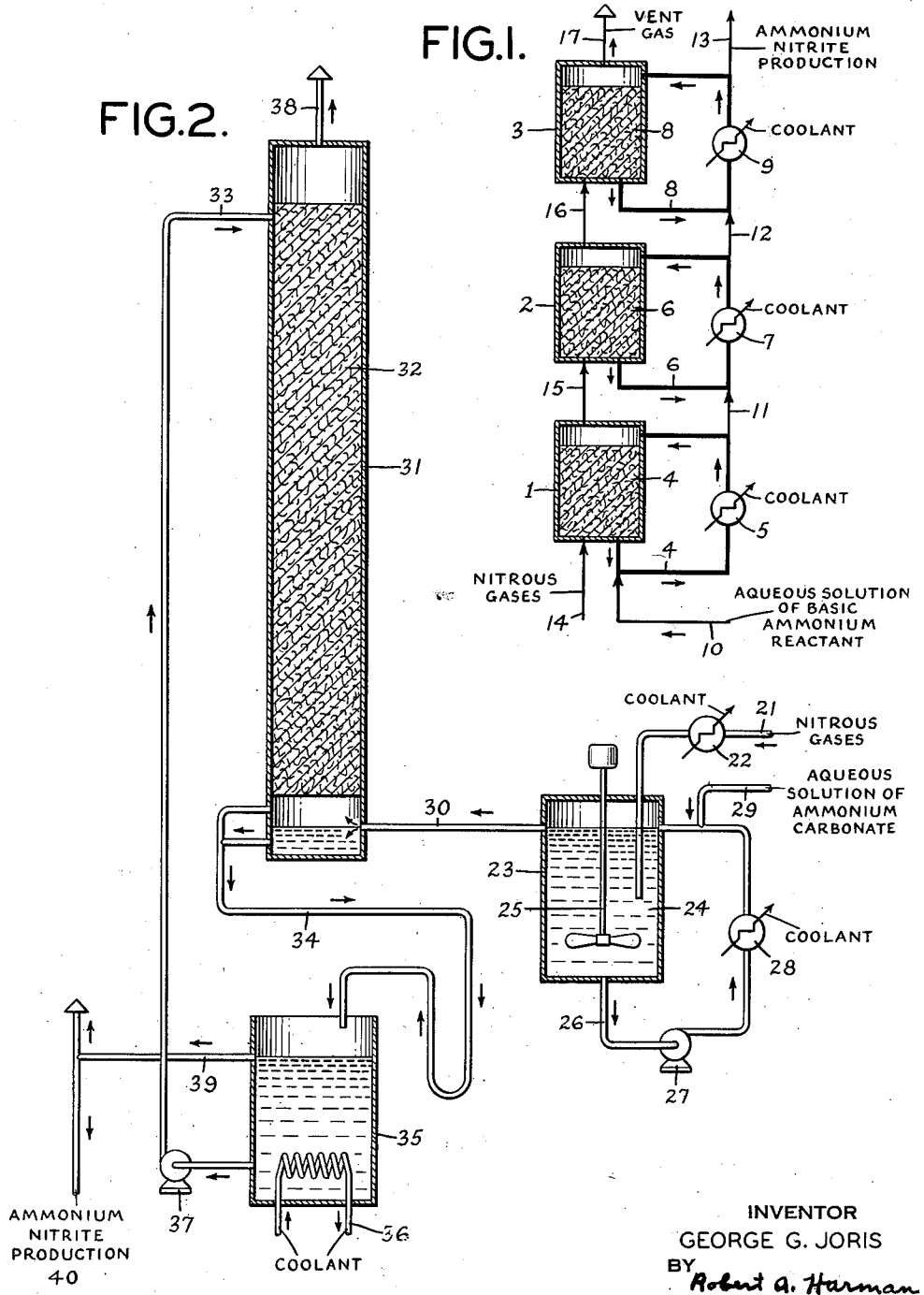

2,797,144
PRODUCTION OF AMMONIUM NITRITE SOLUTIONS

George G. Joris, Madison, N. J., assignor to Allied Chemical & Dye Corporation, New York, N. Y., a corporation of New York Application April 11, 1955, Serial No. 500,587

7 Claims. (Cl. 23—104)

This invention relates to producing ammonium nitrite solutions and more particularly to an improvement in producing such solutions by reacting feed gases containing, as nitrogen oxide constituents, nitric oxide and nitrogen dioxide and containing inert diluents such as nitrogen, such feed gases being referred to as nitrous gas with aqueous solutions containing basic ammonium compounds. Suitable nitrous gas for the process can be made by methods such as catalytically oxidizing ammonia with oxygen and thermally or electrically fixing atmospheric nitrogen by reaction with oxygen. Nitrous gas from such sources usually contains sufficient oxygen, free or combined in the form of nitrogen dioxide, for the nitrition reaction, i. e. at least the amount of oxygen theoretically needed for the conversion of the nitrogen oxide content of the gas to $N_2O_3$.

One of the principal uses of ammonium nitrite is for the production of hydroxylamine compounds. For such work an aqueous solution of ammonium nitrite can be used.

The nitrite-producing reaction dealt with herein can be considered as a type of gas absorption including physical absorption of gaseous components by the basic ammonium compound solution and stripping of volatile components from this solution, together with a multiplicity of liquid phase and gas phase reactions and side reactions. While the complexity and rapidity of what occurs during absorption may preclude exact knowledge of the chemical and physical mechanisms for the process, the following equations will serve as a guide for understanding the reaction using, for example, ammonium bicarbonate as the basic ammonium compound added to the absorbing solution.

Principal reactions (1) $2NO + O_2 \underset{\text{elevated temperature}}{\overset{\text{reduced temperature}}{\rightleftarrows}} 2NO_2$
nitric oxide   oxygen           nitrogen dioxide (2) $NO + NO_2 \rightleftarrows N_2O_3$
                           nitrogen trioxide (3) $N_2O_3 + H_2O \longrightarrow 2HNO_2$
          water         nitrous acid (4) $HNO_2 + NH_4HCO_3 \longrightarrow NH_4NO_2 + CO_2 + H_2O$
ammonium bicarbonate or other basic ammonium salt   ammonium nitrite   carbon dioxide A summation of the preceding equations can be written as follows:

(4a) $4NO + O_2 + 4NH_4HCO_3 \longrightarrow 4NH_4NO_2 + 2H_2O + 4CO_2$
or other basic ammonium salt When the ammonium compound in the aqueous absorbing solution is ammonium sulfite, a considerable quantity of ammonium hydroxylamine disulfonate can be made simultaneously with the nitrite. The equation for this reaction is (5) $3HNO_2 + 2(NH_4)_2SO_3 \longrightarrow 2NH_4NO_2 + HON(SO_2NH_4)_2 + H_2O$
ammonium sulfite              ammonium hydroxylamine disulfonate

Side reactions (6) $5NO_2 + 4NH_4HCO_3 \longrightarrow$
or other basic ammonium salt
$3NH_4NO_3 + NH_4NO_2 + 2H_2O + NO + 4CO_2$
ammonium nitrate (7) (a) $4NH_3 + 4NO + O_2$
or
(b) $4NH_3 + 2NO_2 + 2NO$ $\Big\} \longrightarrow 4N_2 + 6H_2O$
nitrogen (8) $NH_4NO_2 \longrightarrow N_2 + 2H_2O$ The side reaction represented by Equation 7 is believed to take place in the vapor phase, ammonia liberated from solution reacting with the nitrous gas. The side reaction represented by Equation 8 shows decomposition of ammonium nitrite by heat. In addition, when ammonium sulfite is used in the absorbing solution, this material can be oxidized to the sulfate.

As indicated in Equation 1 above, oxidation of nitric oxide by oxygen to form nitrogen dioxide is reversible with temperature. Use of low temperatures such as those desired for ammonium nitrite production accelerates the rate of formation of nitrogen dioxide. This rate diminishes as the proportion of inert diluent in the nitrous gas increases.

The formation of ammonium nitrite described by the summary Equation 4a, above, is accompanied by evolution of heat. Removal of heat from and control of temperature of the absorbing solution are very important to prevent breakdown of the ammonium nitrite product. Heat of the reaction represented by Equation 4a is about 11 kilogram calories per gram mol of ammonium nitrite made.

An object of this invention is an improvement in a gas absorption of the type described whereby utilization of the ammonium compound reactants can be made substantially complete and contamination of the product liquor by unreacted materials thereby reduced.

Still another object of this invention is an improvement in a gas absorption of the type described whereby high yields of ammonium nitrite can be obtained together with substantial suppression of the nitrate-forming side reaction indicated by Equation 6.

These and other objects appearing hereinafter are realized in my process for producing ammonium nitrite, wherein nitrous gas containing as nitrogen oxide constituents nitric oxide and nitrogen dioxide in the mol ratio of at least 4:1 nitric oxide:nitrogen dioxide, said nitrous gas having on an anhydrous basis mol percent nitric oxide concentration of at least 2.0% and inert gas concentration of at least 65 mol percent, is contacted with oxygen and at least one basic ammonium compound of the group consisting of the ammonium carbonates and ammonium sulfite dissolved in aqueous basic solution. More particularly my process comprises the improvements of maintaining at least a pair of communicating gas-liquid scrubbing zones in a process as above; recirculating through each of said zones a separate body of the aqueous basic solution; cooling the separate body of solution in each zone to temperature between about 40° C. and about minus 5° C.; feeding into absorbing contact with the aqueous solution in the first zone at least part of the incoming nitrous gas; continuing absorption in the first zone until ¼–¾ of the nitrogen oxide content of the gas is removed from the gas fed thereto; continuously passing the increment in the body of solution in each zone except the last one to the body of solution of a zone following, and continuously passing unabsorbed gas from each zone except the last one to a zone following, thereby maintaining in the body of solution in each zone successively lower concentration of basic ammonium compound in contact with nitrous gas successively less concentrated in said nitrogen oxide constituents; withdrawing unabsorbed gas from the last zone; and withdrawing as product the increment in ammonium nitrite solution from the last zone.

Increasing concentrations of nitrogen dioxide in the gas phase remote the side reaction forming nitrate per Equation 6, above. By feeding to the absorption system gas having a nitric oxide:nitrogen dioxide mol ratio of at least 4:1, and preferably of at least 10:1, and absorbing the nitrogen dioxide mol-for-mol with nitric oxide as soon as additional nitrogen dioxide is formed, per Equations 2, 3 and 4 above, a high ratio of nitric oxide:nitrogen dioxide will be maintained so that the desired reaction will proceed while the nitrate-forming reaction of Equation 6 above will be repressed.

My improved process is a practical application of my discovery that with decrease in the rate of absorption of a nitrous gas in the above-outlined absorption process, accompanying the decrease in nitrogen oxide concentrations in the gas, the rate of oxidation of nitric oxide by oxygen to form nitrogen dioxide in said gas is at the same time depressed in a much greater proportion by the decrease in concentration of the nitric oxide and free oxygen which accompanies said absorption. By use of my process I maintain relatively high concentrations of ammonium compound in the first zone whereby the speed of nitrogen oxide absorption therein is increased over that which would result under like conditions except using lower ammonium compound concentrations. In the succeeding zone or zones, in my process absorption proceeds at relatively low nitric oxide concentration. Under these conditions the rate of absorption so much outweighs rate of nitrogen dioxide formation that the slower absorption due to lower ammonium compound concentration does not result in build-up of nitrogen dioxide vs. nitric oxide in the gas. Accordingly my process minimizes nitrate formation per Equation 6 above. Ammonia oxidation per Equations 7a and b above is minimized in my process by rapidity of nitrogen oxide absorption in the first stage and by use in preferred operations of relatively low concentrations of ammonium compound in the subsequent stages.

Nitrous gas feeds used in accordance with my invention contain a substantial proportion of inert gas diluents such as nitrogen and so become successively less concentrated in nitrogen oxide constituents as absorption proceeds. For practical purposes the benefits of my process are obtained when the nitrous gas fed to the first zone has, on an anhydrous basis, mol percent concentration of nitric oxide of at least 2% and inert gas concentration of at least 65 mol percent. When the diluent concentration is substantially below this, deleterious local acidic conditions are apt to develop in the less alkaline absorbing solution of the second or later absorption zones. Moreover at lower diluent gas concentrations the decrease in total gas volume resulting from absorption will tend to maintain nitrogen oxide concentrations in the gas phase at a constant level, rather than allowing these concentrations to decrease in the desired manner as absorption proceeds.

The preferred source of nitrous gas for the practice of my invention is the catalytic combustion of ammonia-air mixtures containing from about 6 to about 11 volume percent ammonia, and more particularly about 9 volume percent ammonia. Such gases have sufficiently high nitrogen oxide content to be attractive economically and more than the theoretically sufficient amount of oxygen to combine with nitric oxide for forming nitrous acid anhydride, $N_2O_3$, making it unnecessary therefore to add supplemental oxygen to the gas to get maximum utilization of nitrogen oxides.

Nitrogen oxides leaving an ammonia burner are practically completely dissociated into nitric oxide and oxygen. By quick cooling of the gases before their introduction into the first zone, the cooling load on the absorption system can be reduced while maintaining the desired high ratio of nitric oxide:nitrogen dioxide. However, the feed gases should not be precooled so much that water condenses out since such condensate is highly corrosive.

While I have found that my process is operable over a fairly wide range of temperature, for consistently good yields, I prefer to operate with the circulating nitrite solutions at temperature between about 5° and minus 5° C. Scrubbing contact between liquid and gas in the first zone should be maintained until a substantial portion of the nitrogen oxides are removed so that the nitric oxide concentration, and consequently the rate of oxidation of nitric oxide to nitrogen dioxide in the gases going through the rest of the system will be substantially reduced. In my process, I maintain such scrubbing contact in the first zone until between about ¼–¾ and, more especially, about 50–60% of the nitrogen oxide constituents in the nitrous gas feed are removed. Using the preferred feed gas, i. e. that obtained from catalytic combustion of an ammonia-air mixture containing about 9 volume percent ammonia, and passing it into the first zone only, I have found that about 60% of the ammonium nitrite formed in the entire process is formed in the first zone using a contact time therein of liquid-to-gas of about two seconds based on the empty volume of the first zone contacting vessel divided by the volumetric rate of inlet nitrous gas calculated on an anhydrous basis at 0° C.

I have found that use of a pair of gas-liquid contacting zones is well adapted for commercial operation.

In typical operation the feed gases and basic ammonium compound are introduced into the first zone. The unabsorbed gases are passed through each zone thereafter continuously in series, and the residue gases withdrawn from the last zone continuously. The increment in the solution of each zone except the last one is withdrawn and passed to the solution of the next zone. The ammonium reactant can be fed intermittently or continuously to the first zone absorbing solution, and ammonium nitrite production can be withdrawn continuously or intermittently from the last zone absorbing solution, continuous flows being preferred in commercial operations for obtaining maximum equipment economy for given production.

As can be seen from the drawings, my process involves introducing feeds and withdrawing products cocurrently with respect to the gas absorption system as a whole. Figure 1 is a simple schematic representation of one way to practice my invention, pumps being supplied where necessary. 1, 2, and 3 are gas-liquid contacting vessels. Ammonium nitrite solution 4 is maintained between 40° C. and about minus 5° C. by constantly recirculating it from vessel 1 on an external circuit through cooler 5 and back through vessel 1. Ammonium nitrite solution 6 is maintained in the same temperature range as solution 4 by constantly recirculating it from vessel 2 on an external circuit through cooler 7 and back through vessel 2. Ammonium nitrite solution 8 is maintained in the same temperature range as solution 4 by constantly recirculating it from vessel 3 on an external circuit through cooler 9 and back through vessel 3. Aqueous solution 10, of basic ammonium compound, is fed into recirculating solution 4; solution 4 is maintained at substantially constant volume by withdrawing the increment thereof, 11, i. e. the excess of solution over that initially present, and adding it to recirculating solution 6. Solution 6 is maintained at substantially constant volume by withdrawing increment 12 and adding it in the same manner to recirculating solution 8. The increment in solution 8 is withdrawn from the system as ammonium nitrite production 13, thereby maintaining solution 8 at substantially constant volume.

Nitrous gases 14, suitably from catalytic combustion of an ammonia-air mixture, are introduced into vessel 1 and therein scrubbed with solution 4 sufficiently to remove a substantial fraction of the nitrogen oxide constituents. Unabsorbed gases 15 are withdrawn from vessel 1 and introduced into vessel 2 wherein they are scrubbed with solution 6 to remove a second fraction of the nitrogen oxide constituents. Unabsorbed gases 16 are withdrawn from vessel 2 and introduced into vessel 3 wherein they are scrubbed with solution 8 to remove at least a major portion of the nitrogen oxide constituents still remaining. Vent gas 17, depleted in nitrogen oxides, is withdrawn from vessel 3 co-current with the ammonium nitrite production 13 from recirculating solution 8.

Figure 2 is a flow diagram depicting another embodiment of my invention and is fully explained in Example 1 following.

The basic ammonium compounds which I feed to my process are selected from the group consisting of the ammonium carbonates and ammonium sulfite. By the phrase "the ammonium carbonates," I intend to embrace ammonium bicarbonate, $NH_4HCO_3$; ammonium carbonate, $(NH_4)_2CO_3$; commercial ammonium carbonate, $NH_4HCO_3.NH_4CO_2NH_2$; ammonium sesquicarbonate, $(NH_4)_2CO_3.2NH_4HCO_3H_2O$; ammonia and carbon dioxide equivalent to any of these materials; and mixtures of these carbonates and carbamates and/or the gaseous components for them or their hydrates. As pointed out above, use of ammonium sulfite is particularly advantageous when the ammonium nitrite solution produced is to be used for making hydroxylamine compounds.

The nitrous gas introduced into the process, being acidic when absorbed in water, converts ammonium carbonate to ammonium bicarbonate. Thus, when ammonium carbonate is fed to the first zone, a mixture of carbonate and bicarbonate will result. Because of its high equivalent ammonia content and good solubility in water, the preferred basic ammonium compound for feeding into the first zone is ammonium carbonate, $(NH_4)_2CO_3$.

For efficiency and economy in the process I prefer to add basic ammonium compound to the first zone at a rate providing about 85 to 150 percent of the ammonia theoretically needed to absorb as ammonium nitrite the whole of the nitrogen oxide content in the nitrous gas fed to the first zone. In the preferred embodiment of my process using two absorption stages I have found that by feeding to the first zone about 100–150% of this theoretically needed ammonium carbonate, I can maintain the desired rapid attenuation of the nitrous gases in the first zone and the preferred low normality of ammonium carbonate and/or ammonium bicarbonate in the ammonium nitrite solution of the subsequent zone.

I have found that substantial ammonium nitrite decomposition can be prevented by limiting the ammonium nitrite concentration in the absorbing solution of the last zone to not substantially above 25% by weight and preferably about 15% by weight.

When ammonium sulfite is used in the adsorbing solution and some ammonium hydroxylamine disulfonate is made along with the ammonium nitrite, the combined concentration of the nitrite and the disulfonate should be similarly limited, that is to about 3.9 and preferably to about 2.3 gram mol of ammonium nitrite plus ammonium hydroxylamine disulfonate per 1000 grams of solution.

The amount of water fed is regulated to maintain the desired product solution strength. Using nitrous gas from the preferred source, i. e. ammonia combustion gas, 1½ mols of water per mol of ammonia burned is contained in the nitrous gas. Additional water can be fed separately or as solvent or slurrying agent for the ammonium compound. To maintain ammonium nitrite concentration of about 15% in the last absorption zone solution when using the preferred ammonium compound, ammonium carbonate, I have found that it is necessary to feed, in addition to the water from ammonia combustion, about 5 parts by weight of water per part of ammonium carbonate fed.

The gas-liquid contacting zones used in practicing my invention are suitably maintained in conventional apparatus such as agitator tanks with gas feed thereto, or towers wherein gas and liquid contact is maintained by distributing gas and liquid flows over packing, trays, or decks. I have found it efficient and economical to feed the nitrous gas into an agitator tank as first zone and to conduct the unabsorbed gases therefrom into a packed tower as second zone. A heavy recirculated flow of refrigerated ammonium nitrite is maintained through each zone to establish and maintain effectively the necessary temperature of operation in each solution. Refrigeration of the solution can be maintained very efficiently with tubular heat exchangers.

In the second zone I have found it advantageous to maintain the volumetric ratio of recirculated liquid: entering gas at least 0.1:1 to get efficient absorption, the volume of entering gas being measured at 0° C.

Operating pressure in each zone is preferably about atmospheric for efficiency and economy, but higher and lower pressures can be used when necessary or desirable.

For the entire process, I prefer materials of construction which afford good corrosion resistance, e. g. glass, stainless steel and aluminum.

The following examples describe completely specific embodiments of my invention but are not to be considered as limiting it.

*Example 1.*—Referring to Figure 2 of the drawings, 1.31 pounds per hour of ammonia as an ammonia-air mixture containing about 9 volume percent ammonia and about 19 volume percent oxygen was catalytically burned at about 95% efficiency using a cobalt oxide catalyst at about 700° C. to produce nitrous gas 21 having the following analysis in mol percent on an anhydrous basis: 9.6 NO, 9.1 $O_2$, and 81.3 permanent gases, principally nitrogen. Nitrous gas 21 was quickly cooled to about 150° C. in tubular heat exchanger 22 so as to maintain the mol ratio of nitric oxide:nitrogen dioxide about 10:1, then continuously fed into enclosed aluminum agitator tank 23 which was 12 inches in diameter and 18 inches high. Agitator tank 23 was filled with aqueous ammonium nitrite solution 24 being stirred with mixer 25. Portion 26 of solution 24 was withdrawn continuously from the bottom of tank 23 and recycled by pump 27 on an external circuit through refrigerated heat exchanger 28 and back to tank 23. Flow 29, a 16% solution of ammonium carbonate, $(NH_4)_2CO_3$, in water, was introduced into recycling portion 26 at the rate of 19.5 pounds per hour this rate providing about 89% of the ammonia theoretically needed to absorb as ammonium nitrite the whole of the nitrogen oxide content of the gas being fed to agitator tank 23, and temperature of solution 24 was maintained between 2° and 5° C. throughout the run.

Unabsorbed gases from agitator tank 23 passed through line 30 near the top of said tank at the rate of about 6 cu. ft. per minute and into the base of a 2 foot internal diameter by 12 foot tall vented absorption tower 31 made of aluminum and packed with 2 inch ceramic Raschig rings 32. The packing in the absorption tower was irrigated at the rate of 35 U. S. gallons per minute by aqueous ammonium nitrite irrigating solution 33 which entered near the top of the tower, drained out sealed leg 34 at the base, flowed into 110-gallon sump 35 refrigerated with submerged refrigerating coils 36 and was recirculated by pump 37 back to the top of the tower. The recirculation rate was such that the solution had essentially the same composition through the tower and sump. Unabsorbed gas from the tower was withdrawn through vent 38.

As recycled ammonium nitrite solution 24 of the first absorption zone to which ammonium carbonate was being added, exceeded the volume of agitator tank 23, the increment in solution overflowed in line 30. This overflow of solution containing ammonium reactants mixed with the irrigating solution 33 of the second zone. Throughout the run pH of solution 24 and solution 33 were from 8.3 to 8.5. Temperature of solution 33 was maintained between 1° and 5° C. Volume of solution 33 was kept essentially constant by permitting the increment therein to overflow from sump 35 through drain 39 to storage as ammonium nitrite production 40. The average rate of ammonium nitrite product solution overflow was 23.6 pounds per hour. The product solution contained 18 weight percent ammonium nitrite and 0.6 weight percent ammonium nitrate, the ammonium nitrate being 3.3% of the ammonium nitrite produced.

The ratio of ammonium nitrite made in agitator tank 23 to that produced by the entire process was about 0.6:1, indicating that about 60% of the nitrogen oxide constituents in the nitrous gases introduced into tank 23 were being absorbed in the first contacting zone. Yield of ammonium nitrite based on the ammonia being fed to the catalytic burner was 84.5%.

*Example 2.*—The arrangement of equipment used in the operation described below was similar to that described in detail in Example 1, except as specifically noted.

1 gram mol per hour of ammonia as an ammonia-air mixture containing 9 volume percent ammonia was burned as described in Example 1. The burner gases were quickly cooled to 180° C. then continuously fed into a first glass tower 2 inches in internal diameter and 24 inches tall and packed with ¼ inch Berl saddles. The volumetric rate of nitrous gas flow into the first tower, calculated on an anhydrous basis at 0° C., was about 70 milliliters per second. The packing in the first glass tower was irrigated at the rate of 1300 milliliters per minute by a first aqueous ammonium nitrite solution which entered near the top of the first tower, drained out a liquid sealed leg at the base, flowed into a 2000 milliliter sump, and was recirculated by pump through a cooling coil submerged in a Dry Ice-alcohol bath back to the top of the first tower.

Unabsorbed gas, about 67 milliliters per minute, was vented from the top of the first tower and conducted into the base of a second glass tower 3 inches in internal diameter and 8 feet tall and packed with ¼ inch Berl saddles. The packing in the second tower was irrigated at the rate of 11,300 milliliters per minute by a second aqueous ammonium nitrite solution which entered near the top of the tower, drained out a liquid sealed leg at the base, flowed into a 4000 milliliter sump and was recirculated by pump through a cooling oil submerged in a Dry Ice-alcohol bath back to the top of the second tower. Unabsorbed gas from the system was vented from the top of the second tower.

An aqueous solution containing 19 weight percent ammonium carbonate was introduced into the first sump at average rate of 300 grams per hour; this rate providing about 125% of the amount of ammonia theoretically needed to absorb as ammonium nitrite the whole of the nitrogen oxide content in the nitrous gas fed to the first tower. Temperature of the first circulating ammonium nitrite solution was maintained between 0° and 5° C. throughout the run. The initial volume of the ammonium nitrite solution in the first tower circuit was 1760 milliliters and it contained initially 88 grams of ammonium nitrite and 1.7 grams of ammonium nitrate per liter. The initial volume of the ammonium nitrite solution in the second tower circuit was 3300 milliliters and it contained initially 157 grams of ammonium nitrite and 3.2 grams of ammonium nitrate per liter. As the run progressed, the increment in the first solution above the initial 1760 milliliters was pumped continuously into sump of the second tower; this increment of solution passing from the first tower circuit to the second tower circuit maintained the ammonium nitrite solution of the second tower circuit at pH of about 7.9 throughout the run. At intervals of one half hour a portion of solution in second sump was withdrawn and stored. Temperature of the second ammonium nitrite solution was maintained between 0° and 5° C. throughout the run. The mol ratio of nitrate made to nitrite made during the run was 0.029. The ratio of ammonium nitrite made in the first glass tower to that produced by the entire process was about 0.6:1, indicating that about 60% of the nitrogen oxide constituents in the nitrous gases introduced into the first glass tower were being absorbed in this contacting zone. Yield of ammonium nitrite based on ammonia being fed to the catalytic burner was about 77%.

I claim:

1. In a process for producing ammonium nitrite solution by contacting nitrous gas containing as nitrogen oxide constituents nitric oxide and nitrogen dioxide in the mol ratio of at least 4:1 nitric oxide:nitrogen dioxide, said nitrous gas having nitric oxide concentration of at least 2 mol percent and inert gas concentration of at least 65 mol percent, with oxygen and at least one basic ammonium compound of the group consisting of the ammonium carbonates and ammonium sulfite dissolved in aqueous basic solution, the improvement which comprises: maintaining at least a pair of communicating gas-liquid scrubbing zones; recirculating through each of said zones a separate body of the aqueous basic solution; cooling the separate body of solution in each zone to temperature between about 40° C. and about minus 5° C.; feeding into absorbing contact with the aqueous solution in the first zone at least part of the incoming nitrous gas; continuing said absorbing contact in said first zone until ¼–¾ of the nitrogen oxide content of the gas is removed from the gas fed thereto; continuously passing the increment in the body of solution in each zone except the last one to a body of solution of a zone following and continuously passing unabsorbed gas from each zone except the last one to a zone following, thereby maintaining in the body of solution in each zone successively lower concentration of basic ammonium compound in contact with nitrous gas successively less concentrated in said nitrogen oxide constituents; withdrawing unabsorbed gas from the last zone; and withdrawing as product the increment in ammonium nitrite solution from the last zone.

2. The process defined in claim 1 wherein temperature of the solution in each zone is maintained between about 5° C. and about minus 5° C.; wherein said nitrous gas contains at least the amount of oxygen theoretically needed for the conversion of the nitrogen oxide content to $N_2O_3$; and wherein the rate of feed of fresh basic ammonium compound to the first zone provides from about 100 to 150% of the ammonia theoretically needed to absorb as ammonium nitrite the whole of the nitrogen oxide content in the nitrous gas being fed to the first zone.

3. The process defined in claim 2 wherein the basic ammonium compound fed to the first zone is ammonium sulfite.

4. The process defined in claim 2 wherein the basic ammonium compound fed to the first zone is ammonium bicarbonate.

5. The process defined in claim 2 wherein the basic ammonium compound fed to the first zone is ammonium carbonate.

6. The process defined in claim 5 wherein concentration of ammonium nitrite in the solution of each zone is maintained below about 25% by weight, and the nitrous gas has the composition resulting from quick cooling of a catalytic combustion product of an ammonia-air mixture containing about 6 to 11 volume percent ammonia.

7. The process defined in claim 6 wherein only two zones are used; all the input nitrous gases are fed to the first zone; absorption is maintained in the first zone until about 50%–60% of the nitrogen oxide content in the nitrous gas fed thereto is absorbed, and concentration of ammonium nitrite in the solution of each zone is maintained at about 15% by weight.

References Cited in the file of this patent

UNITED STATES PATENTS

| | | |
|---|---|---|
| 991,356 | Pauling | May 2, 1911 |
| 1,070,070 | Rothe | Aug. 12, 1913 |
| 2,009,347 | Sheldon | July 23, 1935 |
| 2,027,578 | De Jahn | Jan. 14, 1936 |
| 2,110,431 | Voogd | Mar. 8, 1938 |
| 2,606,813 | Kahr | Aug. 12, 1952 |

FOREIGN PATENTS

| | | |
|---|---|---|
| 685,726 | Great Britain | Jan. 7, 1953 |